(12) United States Patent
Liu et al.

(10) Patent No.: US 11,436,427 B2
(45) Date of Patent: Sep. 6, 2022

(54) GENERATIVE ATTRIBUTE OPTIMIZATION

(71) Applicant: Lawrence Livermore National Security, LLC, Livermore, CA (US)

(72) Inventors: Shusen Liu, Livermore, CA (US); Thomas Han, Livermore, CA (US); Bhavya Kailkhura, Dublin, CA (US); Donald Loveland, Dublin, CA (US)

(73) Assignee: Lawrence Livermore National Security, LLC, Livermore, CA (US)

( * ) Notice: Subject to any disclaimer, the term of this patent is extended or adjusted under 35 U.S.C. 154(b) by 280 days.

(21) Appl. No.: 16/807,006

(22) Filed: Mar. 2, 2020

(65) Prior Publication Data
US 2021/0271867 A1 Sep. 2, 2021

(51) Int. Cl.
*G06K 9/00* (2006.01)
*G06N 3/08* (2006.01)
*G06N 3/04* (2006.01)
*G06K 9/62* (2006.01)

(52) U.S. Cl.
CPC ....... *G06K 9/00362* (2013.01); *G06K 9/6267* (2013.01); *G06N 3/0454* (2013.01); *G06N 3/08* (2013.01)

(58) Field of Classification Search
CPC ................... G06K 9/00362; G06N 3/0454
See application file for complete search history.

(56) References Cited

U.S. PATENT DOCUMENTS

| 2012/0233127 A1* | 9/2012 | Solmer | G06F 16/3347 |
| | | | 707/661 |
| 2017/0161635 A1* | 6/2017 | Oono | G06N 7/005 |
| 2020/0090049 A1* | 3/2020 | Aliper | G06K 9/6262 |
| 2020/0372308 A1* | 11/2020 | Anirudh | G06N 3/08 |

OTHER PUBLICATIONS

Angermueller, C., et al., "Deep learning for computational biology," Molecular systems biology, 12(7):878, 2016.
Bach, S., et al., "On pixel-wise explanations for non-linear classifier decisions by layer-wise relevance propagation," PloS one, 10(7):e0130140, 2015.

(Continued)

*Primary Examiner* — David Bilodeau
(74) *Attorney, Agent, or Firm* — Perkins Coie LLP (57) ABSTRACT

A generative attribute optimization ("GAO") system facilitates understanding of effects of changes of attribute values of an object on a characteristic of the object and automatically identifying attribute values to achieve a desired result for the characteristic. The GAO system trains a generator (encoder and decoder) using an attribute generative adversarial network. The GAO model includes the trained generator and a separately trained predictor model. The GAO model inputs an input image and modified attribute values and employs the encoder and the decoder to generate a modified image that is the input image modified based on the modified attribute values. The GAO model then employs the predictor model to that inputs the modified image and generate a prediction of a characteristic of the modified image. The GAO system may employ an optimizer to modify the attribute values until an objective based on the desired result is achieved.

26 Claims, 4 Drawing Sheets

(56) References Cited

OTHER PUBLICATIONS

Baldi, P., et al., "Searching for exotic particles in high-energy physics with deep learning," Nature communications, 5:4308, 2014.

Erhan, D., et al., "Visualizing higher-layer features of a deep network," University of Montreal, 1341(3):1, 2009.

Ernst, J., et al., "Counterfactual visual explanations," In ICML, pp. 264-279, 2019.

Goodfellow, I., et al., "Generative adversarial nets," In Advances in neural information processing systems, pp. 2672-2680, 2014.

Goodfellow, J., I., et al., "Explaining and harnessing adversarial examples," arXiv preprint arXiv:1412.6572, 2014.

Goyal, Y., et al., "Counterfactual visual explanations," CoRR, abs/1904.07451, 2019.

He, Z., et al., "AttGAN: Facial Attribute Editing by Only Changing What You Want," in IEEE Transactions on Image Processing, vol. 28, No. 11, pp. 5464-5478, Nov. 2019.

Hendricks, A., L., et al., "Grounding visual explanations," In Proceedings of the European Conference on Computer Vision (ECCV), pp. 264-279, 2018.

Hogan, T., et al., "Universal hard-label black-box perturbations: Breaking securitythrough-obscurity defenses," arXiv preprint arXiv:1811.03733, 2018.

Kim, B., et al., "Examples are not enough, learn to criticize! criticism for interpretability," In Advances in Neural Information Processing Systems, pp. 2280-2288, 2016.

Kim, B., et al., "Interpretability beyond feature attribution: Quantitative testing with concept activation vectors (tcav)," arXiv preprint arXiv:1711.11279, 2017.

Kusner, M., J., et al., "Counterfactual fairness," In Advances in Neural Information Processing Systems, pp. 4066-4076, 2017.

Lecun, Y., et al., "Deep Learning," nature, 521(7553):436, 2015.

Lecun, Y., et al., "Gradient-based learning applied to document recognition," Proceedings of the IEEE, 86(11):2278-2324, 1998.

Lecun, Y., et al., "MNIST handwritten digit database," 2010.

Liu, Y., et al., "Materials discovery and design using machine learning," Journal of Materiomics, 3(3):159-177, 2017.

Liu, Z., et al., "Deep learning face attributes in the wild," In Proceedings of the IEEE international conference on computer vision, pp. 3730-3738, 2015.

Narendra, T., et al., "Explaining deep learning models using causal inference," arXiv preprint arXiv:1811.04376, 2018.

Nguyen, A., et al., "Multifaceted feature visualization: Uncovering the different types of features learned by each neuron in deep neural networks," arXiv preprint arXiv:1602.03616, 2016.

Olah, C., et al., "Feature visualization," Distill, 2(11):e7, 2017.

Pearl, J., et al., "Causal inference in statistics: An overview," Statistics surveys, 3:96-146, 2009.

Radford, A., et al., Unsupervised representation learning with deep convolutional generative adversarial networks. arXiv preprint arXiv:1511.06434, 2015.

Ribeiro, T., M., et al., "Why should i trust you?: Explaining the predictions of any classifier," International Conference on Knowledge Discovery and Data Mining, pp. 1135-1144. ACM, 2016.

Selvaraju, R., R., et al., "Grad-cam: Visual explanations from deep networks via gradient-based localization," In Proceedings of theIEEE International Conference on Computer Vision, pp. 618-626, 2017.

Simonyan, K., et al., "Deep inside convolutional networks: Visualising image classification models and saliency maps," arXiv preprint arXiv:1312.6034, 2013.

Thiagarajan, J., J., et al., TreeView:Peeking into deep neural networks via feature-space partitioning. arXiv preprint arXiv:1611.07429, 2016.

Yosinski, J., et al., "Understanding neural networks through deep visualization," arXiv preprint arXiv:1506.06579, 2015.

Yuan, X., et al., "Adversarial examples: Attacks and defenses for deep learning," IEEE transactions on neural networks and learning systems, 2019.

Zeiler, M., D., et al., "Visualizing and understanding convolutional networks," In European conference on computer vision, pp. 818-833. Springer, 2014.

\* cited by examiner

GENERATIVE ATTRIBUTE OPTIMIZATION

STATEMENT REGARDING FEDERALLY SPONSORED RESEARCH

The United States government has rights in this invention pursuant to Contract No. DE-AC52-07NA27344 between the U.S. Department of Energy and Lawrence Livermore National Security, LLC, for the operation of Lawrence Livermore National Laboratory.

BACKGROUND

Due to the tremendous success of deep learning, data scientists have employed deep learning in many applications. For example, deep learning classifiers have been employed to identify the species of an animal (e.g., cat or dog) given an image of the animal. A classifier may be trained using training data that includes images of animals that are each labeled with its species in a process referred to a supervised learning. The success of deep learning is due, in part, to its ability to automatically discover suitable feature representations for powerful predictive models that can be built from large and complex training datasets.

The use of deep learning in many applications may be limited because of a lack of understanding as to what factors influence a classifier to generate one classification versus another classification (or regressor to predict one value versus another). For example, in the field of material science, a material scientist may not fully understand how the different attributes (e.g., porosity and particle size) of a material interact to affect the peak stress of the material. This lack of understanding is due in part to the complexity of the regressors and their feature representations. Without such an understanding, a material scientist would not know what attribute values to employ to generate a material to achieve a desired peak stress—even though the peak stress based on that material can be predicted by a regressor based on a scanning electron microscope ("SEM") image of the material. If, however, a material scientist understood the reasons for predictions, the material scientists could focus on producing material by targeting certain combinations of material attributes that may lead to a desired peak stress.

Some attempts have been made to help in understanding of the reasons for the predictions of a deep learning. For example, a pixel-by-pixel explanation (e.g., via a heat map) can be provided to indicate the contributions of the pixels to a prediction such as a heat map that highlights the face of cat in an image when a convolutional neural network ("CNN") predicts the image to contain a cat. Such pixel-by-pixel explanations, however, are not particularly informative in many applications. Continuing with the material science example, if a CNN could be trained to predict the peak stress of a material given an image of the material, the pixel-by-pixel explanation may be based on changes distributed throughout the image. For example, if the peak stress is improved by decreasing porosity or increasing particle size, the pixels throughout the image would be highlighted. Such a pixel-by-pixel explanation may, however, provide very little if any useful information as to how and whether porosity, particle size, or the relationship between them contribute to the peak stress.

DETAILED DESCRIPTION

In some embodiments, a generative attribute optimization ("GAO") system is provided that both facilitates understanding of effects of changes of attribute values for attributes of an object and automatically identifying attribute values to achieve the desired result. The GAO system provides a GAO model that includes a generator model and predictor model. The generator model inputs an input image having attribute values and inputs modified attribute values—modified in the sense that they are different from the attribute values of the object of the input image. The generator model then generates from the input image and the modified attribute values a modified image having the modified attribute values. The predictor model (e.g., classifier or regressor) inputs the modified image and generates a prediction for the object based on the modified image. A person using the GAO system can study both the effects of different attribute values on the predictions and identify attribute values that result in certain predictions.

To facilitate understanding the effects of changes in attribute values on an object, a person may manually input to a generator model an input image having attribute values and different combinations of modified attribute values and receive from the predictor model a corresponding prediction for each combination of modified attribute values. Thus, the GAO system allows a person to analyze the effects of different combinations of attribute values by inputting the combinations of attribute values and an input image and receive predictions for each combination of attribute values. As an example of use of the GAO system, a material scientist may want to study the effects of different attribute values on a material. The material scientist may employ the GAO system to train a GAO model to predict peak stress given an input image of the material and modified attribute values. The GAO model is trained by separately training a generator model and a predictor model. Once trained, to understand the effects of porosity on the peak stress of a material, a material scientist may input to the GAO model an input image (e.g., an SEM image) of the material and repeatedly input combinations of modified attribute values that vary only in porosity. The GAO model then outputs a prediction of peak stress for the material with the modified attribute values. The combinations of modified attribute values may be specified using what may be considered to be "control knobs." The material scientist may vary the attributes values of one or more attributes (i.e., by adjusting the control knobs) to understand, for example, the effects on peak stress of different combinations of porosity and particle size.

To identify attribute values to achieve a desired result, the GAO system may also be employed to automatically identify modified attribute values for an object that have the desired result. The GAO system receives an input image of the object and outputs the modified attribute values for the object that have the desired result. For example, the GAO system may input an image of a material and output the modified attribute values that result in the object having the desired peak stress. The GAO system employs an optimization technique (e.g., gradient descent) to iteratively identify different combinations of modified attribute values that tend to converge on modified attribute values that will result in the desired peak stress. For each combination of modified attribute values, the GAO model generates a modified image based on the input image and the combination of modified attribute values. The GAO model then generates a prediction based on the modified image. The GAO system employs the optimization technique to identify the next combination of modified attribute values to optimize an objective function based on the desired result. The GAO system employs the GAO model to generate a modified image based on the next combination of modified attribute values and predict the result based on the modified image. When a termination criterion is satisfied, the last combination of modified attribute values represents the attribute values for the object that will achieve the desired result. The termination criterion may be based on comparison of the predicted result to the desired result such as a predicted peak stress that is greater than a desired peak stress or based on a certain number of iterations.

The GAO system is described primarily in the context of an object that is a material with attributes such as porosity, particle size, polydispersity, facet, and surface area. The GAO system, however, may be employed with images of any type of object with attributes that can be modified. For example, the GAO system may be employed to identify attributes (e.g., glasses, hair color, or facial feature) of a person that would make that person look older according to a separately trained predictor model for the purpose of understanding the predictor model. The image, that is output by the generator that applies those attributes to a current picture of the person, would represent a picture of the person at an older age according to that predictor model.

The GAO system employs an attribute generative adversarial network ("attGAN") that is based on a GAN to train the generator model of the GAO model. (See, Zhenliang He, Wangmeng Zuo, Meina Kan, Shiguang Shan, and Xilin Chen, "AttGAN: Facial Attribute Editing by Only Changing What You Want," IEEE Transactions on Image Processing, 2019; and Ian Goodfellow, Jean Pouget-Abadie, Mehdi Mirza, Bing Xu, David Warde-Farley, Sherjil Ozair, Aaron Courville, and Yoshua Bengio, "Generative Adversarial Nets," Advances in Neural Information Processing Systems, pp. 2672-2680, 2014, which are hereby incorporated by reference.) An attribute GAN includes a generator and discriminator and an attribute GAN classifier and is trained using training data that includes input images of objects and input attribute values of each object. The generator includes a generator encoder and a generator decoder. The generator encoder inputs an input image and is trained to generate a latent vector of latent variables representing the input image. The generator decoder inputs the latent vector for an input image and the input attribute values. The attribute GAN classifier inputs an image and generates a prediction of its attribute values. The attribute GAN is trained to generate a modified image that represents the input image modified based on the attribute values. The generator encoder and the generator decoder form the generator model of the GAO model.

After the GAO model (both generator model and predictor model) is trained to generate a prediction, an input image is input to the generator encoder to generate a corresponding latent vector. The latent vector and modified attribute values are input to the generator decoder to generate a modified image that is the input image modified based on modified attribute values. The modified image is then input to the predictor model to generate a prediction based on the modified image.

Figure 1:
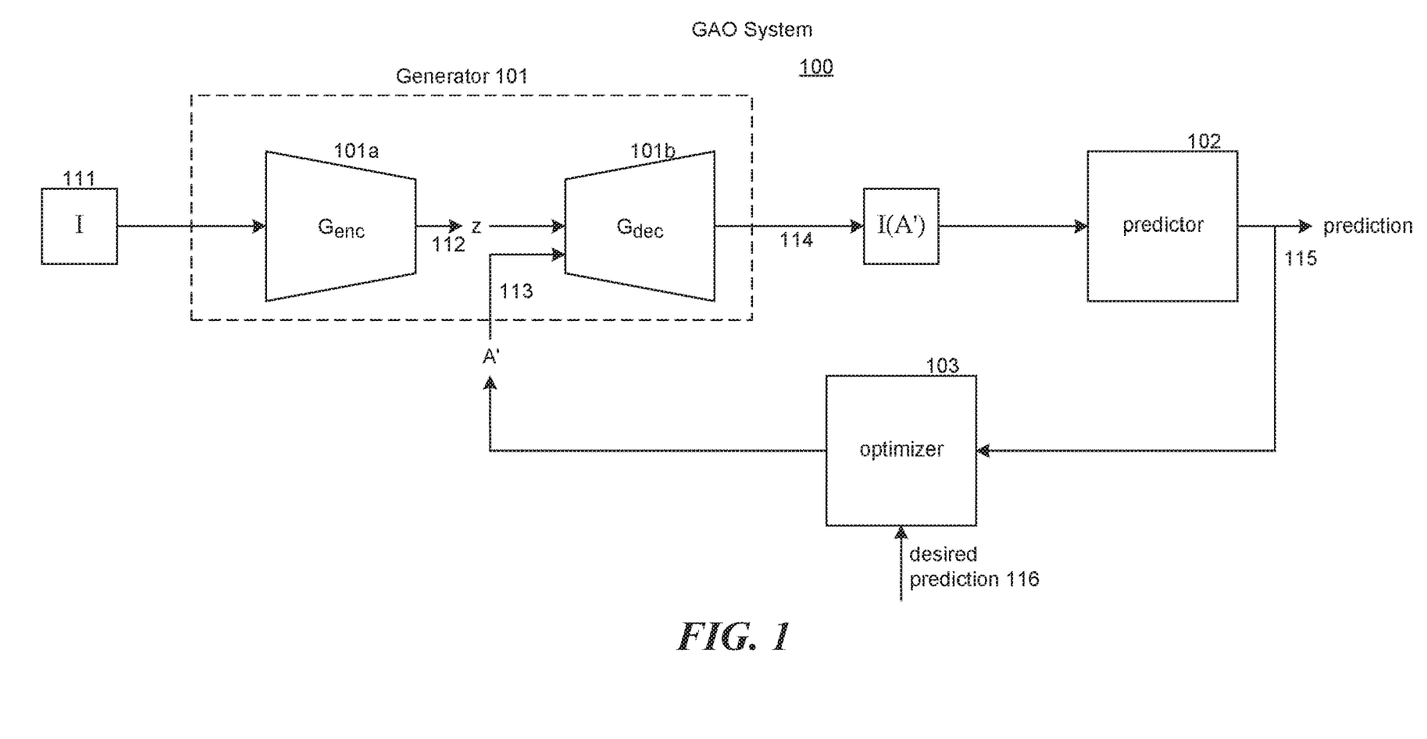
FIG. 1 is a block diagram that illustrates the architecture of the GAO system in some embodiments.

FIG. 1 is a block diagram that illustrates the architecture of the GAO system in some embodiments. The GAO system described below is configured to perform classifications that is the predictor model is a classifier model and the equations relate to a classifier model. The GAO system can, however, be used with a predictor model that is a regressor model. For example, a GAO system used to analyze attributes of a material may employ a regressor model. The equations for a regressor model would be similar to those below but adapted to a prediction that is a continuous variable. The GAO system includes a generator 101, a predictor 102, and an optimizer 103. The generator includes a generator encoder 101a and a generator decoder 101b and is trained using an attribute GAN. The generator encoder inputs an input image I 111 and outputs a latent vector z 112 representing an encoded form of the input image I. The generator decoder inputs the latent vector z and attribute values A' 113 and outputs a modified image I(A') 114 that represents the input image I modified based on the attribute values A'. The predictor is separately trained from the generator and inputs the modified image I(A') and outputs a prediction based on the modified image I(A'). The predictor may be a CNN that is trained using training data that includes images labeled with a characteristic to be predicted. The training data may include that same images used to train the attribute GAN labeled with the characteristic to be predicted. The predictions may be represented by discrete variables (e.g., of a classifier) or continuous variables (e.g., of a regressor). For example, a discrete variable may represent classes, or a continuous variable may represent a value for a characteristic (e.g., peak stress). The optimizer inputs the prediction and a desired prediction 115 and outputs modified attribute values A'. The optimizer may employ a gradient descent method to optimize a loss function that represents the difference between the current prediction and the described prediction to search for attribute values that converge on the desired prediction. The optimizer repeatedly provides attribute values to the generator decoder, receives predictions from the predictor, and generates modified attribute values based on the predictions and the desired prediction until a termination criterion is satisfied. The GAO system may be used without the optimizer to manually input attribute values when studying the effects of various attribute values on the predictions.

In some embodiments, the GAO system, given a query image I for which the classifier C predicts class c (or more generally a predictor generates a prediction), identifies key attribute changes in image I such that making these changes in image I would lead the GAO model to either change its decision about the query to a target class c' or make it more confident about class c (e.g., a higher probability). The GAO system employs the attribute GAN to train a generator G and a discriminator D and may employ a CNN to train classifier C.

As discussed above, the GAO system employs an attribute GAN to train the generator and discriminator. An attribute GAN is based on a GAN that transforms vectors of generated noise (or latent factors) into synthetic samples resembling training data. GANs (and corresponding latent space) are learned in an adversarial manner, i.e., a concept taken from the game theory which assumes two competing networks, a discriminator D (differentiating real vs. synthetic samples) and a generator G (learning to produce realistic synthetic samples by transforming latent factors).

This adversarial learning learns salient attributes of the data in an unsupervised manner which can later be manipulated using the generator.

The GAO system manipulates attribute values $A = \{a_1, \ldots, a_N\}$ of image I to generate a new image $I(A')$ with desired one or more attribute values $A' = \{a_1', \ldots, a_M'\}$ while holding other attribute values $A' = \{a_{M+1}', \ldots, a_N'\}$ constant while holding other attributes constant. The goal of the GAO system may be represented as by the objective function (i.e., loss function) as follows:

$$\min_{A'} \|I - I(A')\|_p$$
$$\text{s.t. } c' = C(I(A'))$$
$$I(A') = G(I; A')$$

where p=1 and class c' is the desired result. When the objective is to find attribute values A' that maximize the probability that image $I(A')$ is in class c, class c' is set to class c. To allow for a closed-form formulation for the objective function, the GAO system may represent the objective function as follows:

$$\min_{A'} \lambda \cdot \text{loss}_{C,c'}(I(A')) + \|I - I(A')\|_p$$

where loss $\text{loss}_{C,c'}$ is cross-entropy loss for predicting image $I(A')$ to label c' using classifier C. Since both classifier C and generator G are differentiable, the gradient of the objective function may be computed using back-propagation, and the attribute values may be generated using gradient descent. To generate a modified image A', the GAO system may be used to repeatedly solve this optimization problem using gradient descent while continually updating $\lambda$ using a method for one-dimensional optimization such as a bisection search.

Figure 2:
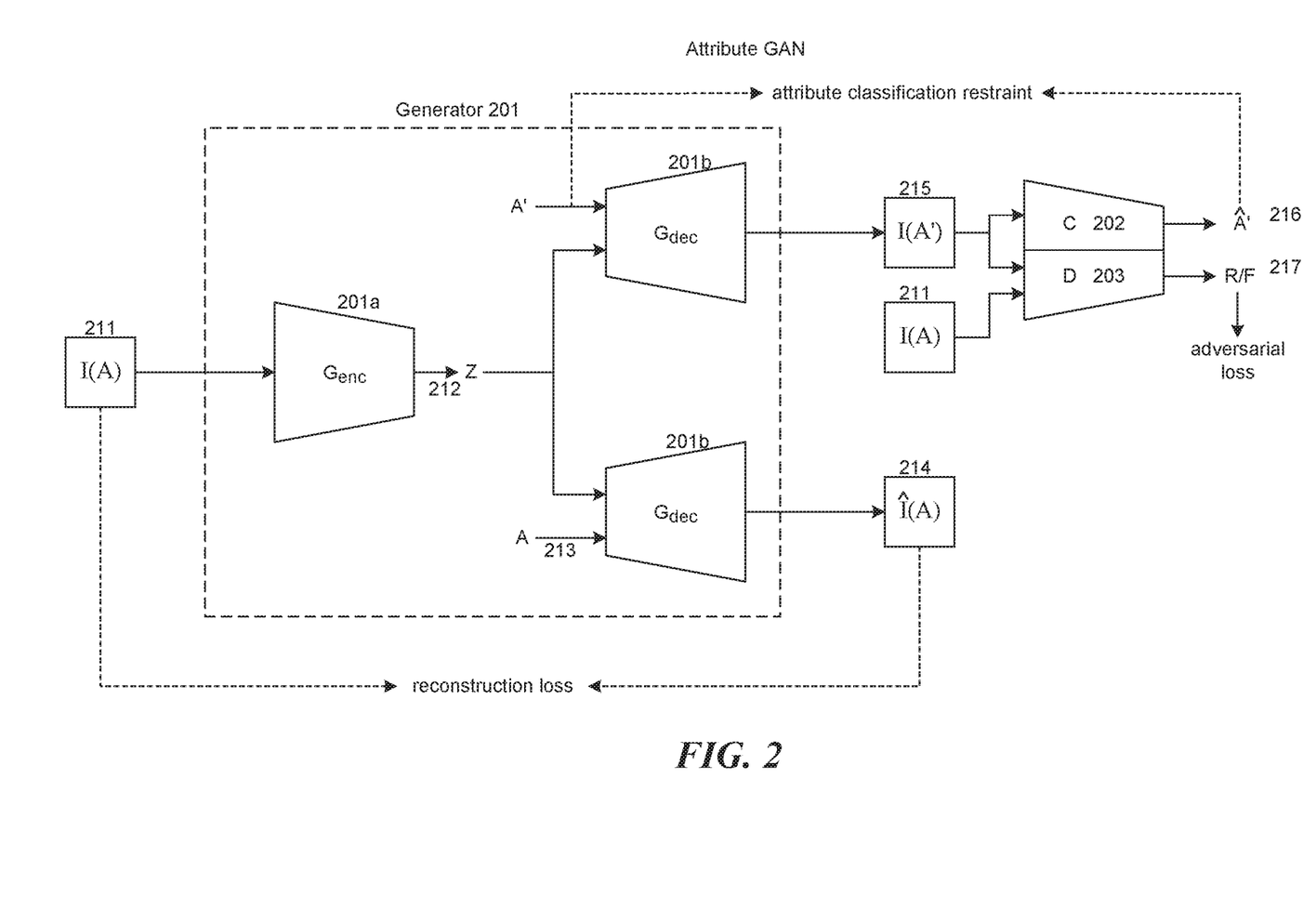
FIG. 2 is a block diagram that illustrates an architecture of an attribute GAN.

FIG. 2 is a block diagram that illustrates an architecture of an attribute GAN. The attribute GAN includes a generator 201, a classifier 202, and a discriminator 203. The generator includes a generator encoder 201a and a generator decoder 201b. The generator encoder inputs an input image 211 and generates a latent vector 212 representing the input image. The two instances of the generator decoder share the same parameters that are learned during the training process. One instance inputs the latent vector and input attribute values 213 of the input image and generates a modified image 214 that is to approximate the input image given the current parameters of the generator decoder. The other instance of the generator decoder inputs the latent vector and attribute values 216 that are learned during training and generates a modified image 215 based on the modified attribute values that are modified during the training process. The classifier 202 inputs the modified image 215 and outputs attribute values that are derived from the modified image. The discriminator inputs the modified image 215 and the input image and outputs a flag indicating whether the modified image 215 is real or fake (i.e., from the training images or the modified images). A reconstruction loss metric is used to measure the dissimilarity between the input image and the modified image 214. An attribute classification constraint is used to measure the similarity between the modified attribute values input to the generator decoder and the corresponding modified attribute values output by the classifier. Adversarial loss is a metric representing the accuracy of the discriminator.

Figure 3:
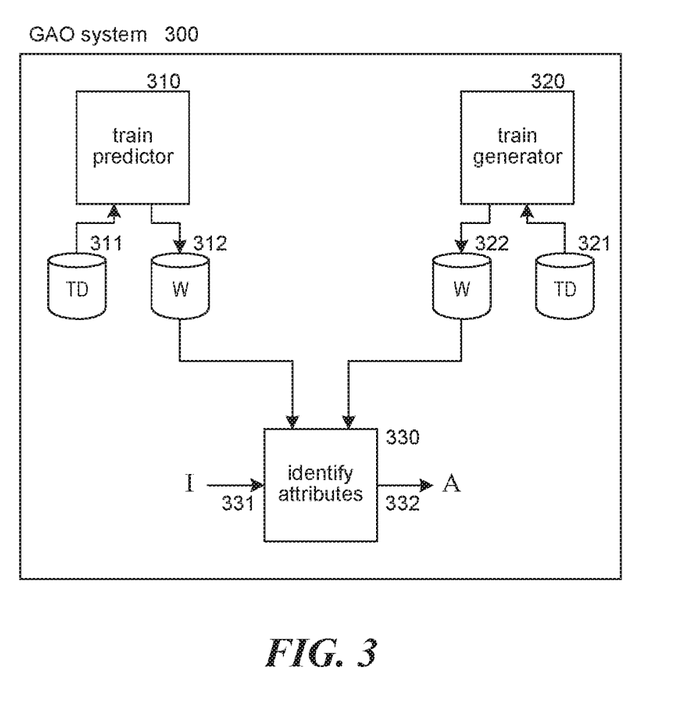
FIG. 3 is a block diagram that illustrates components of the GAO system in some embodiments.

FIG. 3 is a block diagram that illustrates components of the GAO system in some embodiments. The GAO system 300 includes a train predictor component 310 and a train generator component 320 that are employed during a training phase to train the predictor and the generator. In some embodiments, the predictor may be predefined (e.g., generated for another application) and does not need to be trained specifically for the GAO system. The identify attributes component 330 is used to identify the attribute values for a desired prediction. The train predictor component inputs the training data from a training data store 311 that includes images and labels, trains the predictor, and outputs weights to a weights store 312 for the predictor. The train generator component inputs training data from a training data store 321 that includes input images along with their input attribute values, trains a generator that includes a generator encoder and generator decoder using an attribute GAN, and outputs weights to a weights data store 322 for the generator encoder and generator decoder. The identify attributes component inputs an input image 331, applies the GAO model based on the weights of the predictor and the generator, and outputs attribute values to achieve the desired prediction.

Figure 4:
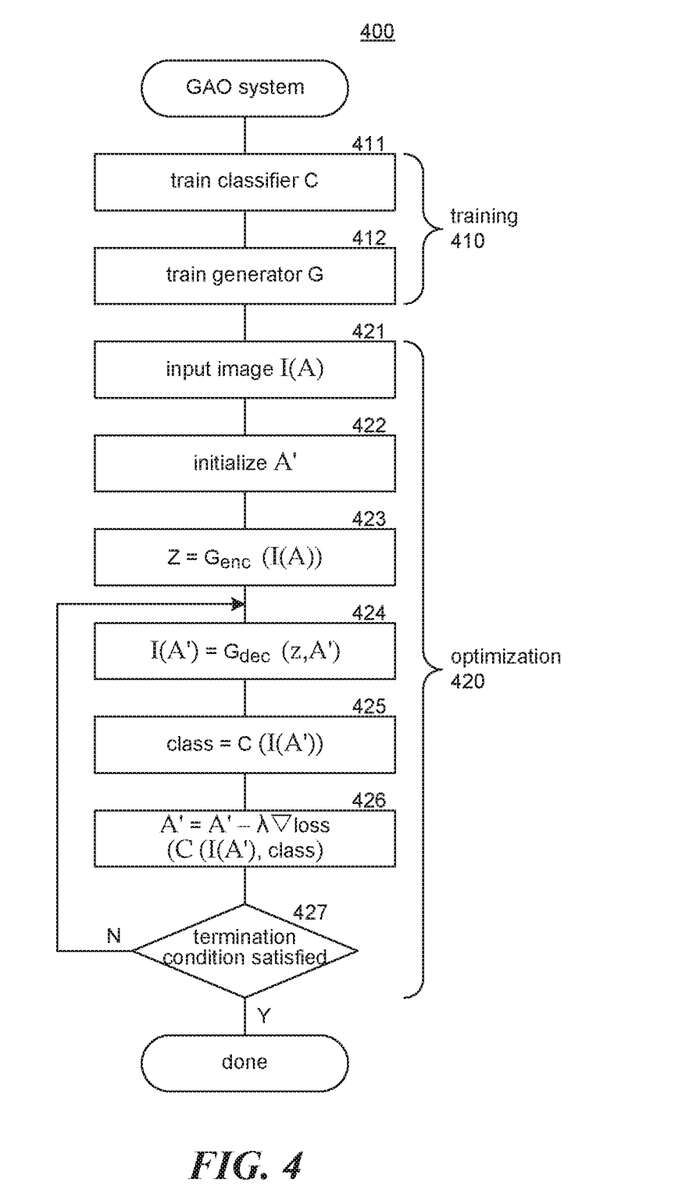
FIG. 4 is a flow diagram that illustrates the processing of the GAO system in some embodiments.

FIG. 4 is a flow diagram that illustrates the processing of the GAO system in some embodiments. The GAO system 400 includes a training phase 410 and an optimization phase 420. During the training phase, in block 411, the system trains the predictor based on training data that includes images and labels. In block 412, the system trains a generator based on training data that includes images labeled with their attribute values. After the predictor and generator are trained, during the optimization phase, in block 421, the system inputs an input image of an object whose attributes are to be evaluated based on a desired result. In block 422, the component initializes modified attribute variables. In block 423, the system applies the generator encoder to the input image to generate a latent vector representing the input image. In blocks 421-427, the system loops generating new modified attribute values until a termination condition is satisfied. In block 424, the system applies the generator decoder to the latent vector and the current modified attribute values to generate a modified image that represents a modification of the input image based on the current modified attribute values. In block 425, the component applies the predictor to the modified image to identify a prediction (e.g., peak stress) for the modified image. In block 426, the component employs a gradient descent method to adjust the current modified attribute values based on the objective function. In decision block 427, if a termination condition is satisfied, then the component completes, else the component loops to block 424 to repeat the process.

The computing systems (e.g., nodes) on which the GAO system may be implemented may include a central processing unit, input devices, output devices (e.g., display devices and speakers), storage devices (e.g., memory and disk drives), network interfaces, graphics processing units, cellular radio link interfaces, global positioning system devices, and so on. The input devices may include keyboards, pointing devices, touch screens, gesture recognition devices (e.g., for air gestures), head and eye tracking devices, microphones for voice recognition, and so on. The computing systems may include desktop computers, laptops, tablets, e-readers, personal digital assistants, smartphones, gaming devices, servers, and so on. The computing systems may access computer-readable media (mediums) that include computer-readable storage media and data transmission media. The computer-readable storage media are tangible storage means that do not include a transitory, propagating signal. Examples of computer-readable storage media include memory such as primary memory, cache memory, and secondary memory (e.g., DVD) and other storage. The computer-readable storage media may have recorded on it or may be encoded with computer-executable instructions or logic that implements the GAO system. The data transmission media is used for transmitting data via transitory, propagating signals or carrier waves (e.g., electromagnetism) via a wired or wireless connection. The computing systems may include a secure cryptoprocessor as part of a central processing unit for generating and securely storing keys and for encrypting and decrypting data using the keys.

The GAO system may be described in the general context of computer-executable instructions, such as program modules and components, executed by one or more computers, processors, or other devices. Generally, program modules or components include routines, programs, objects, data structures, and so on that perform particular tasks or implement particular data types. Typically, the functionality of the program modules may be combined or distributed as desired in various examples. Aspects of the GAO system may be implemented in hardware using, for example, an application-specific integrated circuit ("ASIC") or field programmable gate array ("FPGA").

The following paragraphs describe various embodiments of aspects of the GAO system. An implementation of the GAO system may employ any combination of the embodiments. The processing of the methods described below may be performed by a computing device with a processor that executes computer-executable instructions stored on a computer-readable storage medium that implements the GAO system.

In some embodiments, a method performed by one or more computing systems is provided for generating a modified image corresponding to an input image. The method applies a generator encoder to the input image to generate a latent vector representing the input image. The generator encoder and a corresponding generator decoder having been trained using an attribute generative adversarial network based on attribute values of attributes of images. The method initializes attribute values. The method repeats the following until a termination criterion is satisfied. The method applies the generator decoder to the latent vector and the attribute values to generate a modified image. The method applies a predictor to the modified image to generate a prediction. The method adjusts the attribute values based on an objective for the prediction. In some embodiments, the prediction is represented by a discrete variable. In some embodiments, the prediction is represented by a continuous variable. In some embodiments, the method further trains the attribute generative adversarial network based on training data that include images labeled with attribute values. In some embodiments, the adjusting of the attribute values applies a gradient descent technique to optimize an objective function relating to the objective. In some embodiments, the objective function is a loss function.

In some embodiments, a method performed by one or more computing systems is provided for identifying attribute values of attributes of an input image so that the input image modified based on the attribute values satisfies an objective that is based on a desired prediction, the method initializes the attribute values. The method repeats the following until a termination criterion is satisfied. The method generates a modified image that is the input image modified to have the attribute values. The method applies a predictor to the modified image to generate a prediction for the modified image. The method adjusts the attribute values based on an objective function relating to satisfaction of the objective based on relation between the generated prediction and the desired prediction. When the termination criterion is satisfied, the objective is satisfied by attribute values. In some embodiments, the method further applies a generator encoder to the input image to generate a latent vector representing the image and the generating of the modified image includes applies a generator decoder to the latent vector and the attribute values to generate the modified image. In some embodiments, the generator encoder and the generator decoder are generated based on training an attribute generative adversarial network. In some embodiments, the predictor is a classifier and the prediction is a classification. In some embodiments, the predictor is a regressor and the prediction is a continuous variable. In some embodiments, the image is of a physical object and the prediction is of a characteristic of the physical object. In some embodiments, the predictor is trained using training data that includes images labeled with values for the characteristic. In some embodiments, the image is a scanning electron microscope image of the physical object. In some embodiments, the characteristic is peak stress of the physical object. In some embodiments, the object is a person.

In some embodiments, one or more computing systems for identifying attribute values of attributes are provided. The one or more computing system comprise one or more computer-readable storage mediums for storing computer-executable instructions and one or more processors for executing the computer-executable instructions stored in the one or more computer-readable storage mediums. The instructions include instructions of a generator encoder that inputs an input image and outputs a latent vector representing the input image. The instructions include instructions of a generator decoder that inputs the latent vector and attribute values and outputs a modified image that is the input image modified based on the attribute values. The instructions include instructions of a predictor that inputs the modified image and outputs a prediction relating to the image. The instructions include instructions of an optimizer that inputs the prediction, adjusts the attribute values based on the prediction and an objective for the prediction, and outputs the attribute values after adjustment. The generator decoder, the predictor, and optimizer repeatedly generate modified images, generate predictions, and adjust the attribute values until the objective for the prediction is satisfied. In some embodiments, the generator encoder and the generator decoder are generated based on training an attribute generative adversarial network. In some embodiments, the predictor is a classifier and the prediction is a classification. In some embodiments, the input image is of a physical object and the prediction is of a characteristic of the physical object. In some embodiments, the image is a scanning electron microscope image of the physical object. In some embodiments, the characteristic is peak stress of the physical object.

In some embodiments, a method performed by one or more computing systems is provided for generating a prediction relating to an input image based on modifying attribute values of attributes of the input image. The method accesses a latent vector representing the image. The method accesses modified attribute values. The method applies a generator decoder that inputs the latent vector and the modified attribute values and outputs a modified image that is the input image modified based on the modified attribute values. The method applies a predictor that inputs the modified image and outputs the prediction relating to the modified image. In some embodiments, the modified attribute values are specified by a person. In some embodiments, the modified attribute values are specified by an optimizer that seeks to identify modified attribute values that result in a desired prediction. In some embodiments, the method further applies a generator encoder to the image to generate the latent vector. In some embodiments, the generator encoder and the generator decoder are generated based on training an attribute generative adversarial network.

Although the subject matter has been described in language specific to structural features and/or acts, it is to be understood that the subject matter defined in the appended claims is not necessarily limited to the specific features or acts described above. Rather, the specific features and acts described above are disclosed as example forms of implementing the claims. Accordingly, the invention is not limited except as by the appended claims.

We claim:

1. A method performed by one or more computing systems for generating a modified image corresponding to an input image, the method comprising:
    applying a generator encoder to the input image to generate a latent vector representing the input image, the generator encoder and a corresponding generator decoder being trained using an attribute generative adversarial network based on attribute values of attributes of images;
    initializing attribute values;
    repeating until a termination criterion is satisfied:
        applying the generator decoder to the latent vector and the attribute values to generate a modified image;
        applying a predictor to the modified image to generate a prediction; and
        adjusting the attribute values based on an objective for the prediction.

2. The method of claim 1 wherein the prediction is represented by a discrete variable.

3. The method of claim 1 wherein the prediction is represented by a continuous variable.

4. The method of claim 1 further comprising training the attribute generative adversarial network based on training data that include images labeled with attribute values.

5. The method of claim 1 wherein the adjusting of the attribute values applies a gradient descent technique to optimize an objective function relating to the objective.

6. The method of claim 5 wherein the objective function is a loss function.

7. A method performed by one or more computing systems for identifying attribute values of attributes of an input image so that the input image modified based on the attribute values satisfies an objective that is based on a desired prediction, the method comprising:
    initializing the attribute values; and
    repeating until a termination criterion is satisfied:
        generating a modified image that is the input image modified to have the attribute values;
        applying a predictor to the modified image to generate a prediction for the modified image; and
        adjusting the attribute values based on an objective function relating to satisfaction of the objective based on relation between the generated prediction and the desired prediction
    wherein when the termination criterion is satisfied, the objective is satisfied by attribute values.

8. The method of claim 7 further comprising applying a generator encoder to the input image to generate a latent vector representing the image and wherein the generating of the modified image includes applying a generator decoder to the latent vector and the attribute values to generate the modified image.

9. The method of claim 8 wherein the generator encoder and the generator decoder are generated based on training an attribute generative adversarial network.

10. The method of claim 8 wherein the predictor is a classifier and the prediction is a classification.

11. The method of claim 8 wherein the image is of a physical object and the prediction is of a characteristic of the physical object.

12. The method of claim 11 wherein the predictor is trained using training data that includes images labeled with values for the characteristic.

13. The method of claim 12 wherein the image is a scanning electron microscope image of the physical object.

14. The method of claim 13 wherein the characteristic is peak stress of the physical object.

15. The method of claim 11 wherein the object is a person.

16. One or more computing systems for identifying attribute values of attributes, the one or more computing system comprising:
    one or more computer-readable storage mediums for storing computer-executable instructions for controlling the one or more computing systems to:
        a generator encoder that inputs an input image and outputs a latent vector representing the input image;
        a generator decoder that inputs the latent vector and attribute values and outputs a modified image that is the input image modified based on the attribute values;
        a predictor that inputs the modified image and outputs a prediction relating to the image; and
        an optimizer that inputs the prediction, adjusts the attribute values based on the prediction and an objective for the prediction, and outputs the attribute values after adjustment
    wherein the generator decoder, the predictor, and optimizer repeatedly generate modified images, generate predictions, and adjust the attribute values until the objective for the prediction is satisfied; and
    one or more processors for executing the computer-executable instructions stored in the one or more computer-readable storage mediums.

17. The one or more computing systems of claim 16 wherein the generator encoder and the generator decoder are generated based on training an attribute generative adversarial network.

18. The one or more computing systems of claim 16 wherein the predictor is a classifier and the prediction is a classification.

19. The one or more computing systems of claim 16 wherein the input image is of a physical object and the prediction is of a characteristic of the physical object.

20. The one or more computing systems of claim 19 wherein the image is a scanning electron microscope image of the physical object.

21. The one or more computing systems of claim 20 wherein the characteristic is peak stress of the physical object.

22. A method performed by one or more computing systems for generating a prediction relating to an input image based on modifying attribute values of attributes of the input image, the method comprising:
    accessing a latent vector representing the image;
    accessing modified attribute values;
    applying a generator decoder that inputs the latent vector and the modified attribute values and outputs a modified image that is the input image modified based on the modified attribute values; and
    applying a predictor that inputs the modified image and outputs the prediction relating to the modified image.

23. The method of claim 22 wherein the modified attribute values are specified by a person.

24. The method of claim 22 wherein the modified attribute values are specified by an optimizer that seeks to identify modified attribute values that result in a desired prediction.

25. The method of claim 22 further comprising applying a generator encoder to the image to generate the latent vector.

26. The method of claim 25 wherein the generator encoder and the generator decoder are generated based on training an attribute generative adversarial network.

* * * * *